WILLIAM W. TIMMONS, OF RAHWAY, NEW JERSEY.

Letters Patent No. 86,471, dated February 2, 1869; antedated January 29, 1869.

IMPROVED MEDICATED BEVERAGE.

The Schedule referred to in these Letters Patent and making part of the same.

*To all whom it may concern:*

Be it known that I, WILLIAM W. TIMMONS, of Rahway, in the county of Union, and State of New Jersey, have invented a new and improved Medicated Beverage-Sirup; and I do hereby declare that the following is a full, clear, and exact description thereof, which will enable those skilled in the art to make and use the same.

The nature of this invention relates to sirup used with water in compounding beverage-fluids.

It consists in the combination of water, sugar, soda, or other suitable alkaline matter, with albuminous matter, as the whites of eggs, flour, and citrate of magnesia, in the following proportions, or any reasonable approximation thereto:

White sugar, eight pounds.
Soda, ten ounces.
Water, twenty-five quarts.
Flour, three-fourths of a pint.
The whites of twenty eggs.
Citrate of magnesia, from one-fourth to one-half ounce.

The sugar and soda are first dissolved in the water, and the flour and albumen (whites of eggs) added thereto, and the whole thoroughly commingled by stirring. The citrate of magnesia is then added.

Should it be desired to have the sirup more concentrated, that is to say, of a more viscous consistence, the quantity of water may be reduced for that object, at the discretion of the person compounding the sirup.

Common starch, corn-starch, tapioca, pulverized arrow-root, or other farinaceous or amylaceous matter, in a finely-pulverized state, may be substituted for the flour, the object of which is to form, with the albuminous matter, a froth, or bead, of more body, and at the same time to act, with the citrate of magnesia, as a gentle cathartic medicine.

When compounded as a concentrated sirup, water should be added, to render it more potable.

In using this sirup as a beverage, a small quantity of acid or sub-acid matter, as citric or tartaric acid, or pure wine-vinegar, is put in the tumbler, to combine with the alkaline matter in the sirup, and thereby produce fermentation, during which the albumen and flour (its substitute) are gathered to the surface of the fluid in the form of a thick froth, or bead, the presence of these last-named ingredients serving to retard the effervescence, so that the beverage may be drank slowly.

For the citrate of magnesia may be substituted any other mild purgative medicaments not nauseous or unpalatable.

The citrate of magnesia may be left out, in certain cases, when the purgative effect is desired to be slight, as the flour, or its substitute, will be sufficiently effective without.

I claim as new, and desire to secure by Letters Patent—

Beverage-sirup, compounded as herein described, as a new article of manufacture.

WILLIAM W. TIMMONS.

Witnesses:
CHARLES C. HOFF,
THOS. H. SHAFER.